US006937852B2

(12) United States Patent
Pehrsson

(10) Patent No.: US 6,937,852 B2
(45) Date of Patent: Aug. 30, 2005

(54) PORTABLE COMMUNICATION DEVICE

(75) Inventor: Göran Pehrsson, Malmö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 475 days.

(21) Appl. No.: 09/988,457

(22) Filed: Nov. 20, 2001

(65) Prior Publication Data

US 2002/0061103 A1 May 23, 2002

Related U.S. Application Data

(60) Provisional application No. 60/254,293, filed on Dec. 8, 2000.

(30) Foreign Application Priority Data

Nov. 21, 2000 (SE) ................................. 0004266

(51) Int. Cl.[7] ............................. H04M 3/42; H04M 1/00
(52) U.S. Cl. ................. 455/416; 455/550.1; 379/202.1; 379/399.02
(58) Field of Search ................ 455/95, 426.1, 455/463, 550.1, 553.1, 557, 569.1, 570, 575.1; 379/202.01, 204.01, 205.01, 206.01, 387.01, 399.02

(56) References Cited

U.S. PATENT DOCUMENTS 5,546,458 A    8/1996  Iwami ...................... 379/390
6,012,024 A *  1/2000  Hofmann .................. 704/219
6,078,809 A *  6/2000  Proctor ..................... 455/416
6,289,313 B1 * 9/2001  Heinonen et al. .......... 704/270
6,321,080 B1 * 11/2001 Diethorn .................... 455/416
6,839,417 B2 * 1/2005  Weisman et al. ....... 379/204.01

FOREIGN PATENT DOCUMENTS

GB    2 332 130 A    6/1999
JP     1114245 A     5/1989

OTHER PUBLICATIONS

International–Type Search Report completed Jun. 21, 2001 by Antonio Farieta.

* cited by examiner

Primary Examiner—Binh K. Tieu
(74) Attorney, Agent, or Firm—Jenkens & Gilchrist, P.C.

(57) ABSTRACT

A portable communication device for conference calls, comprising at least first and second speech encoder paths with first and second inputs for connection to first and second recording devices, respectively, and at least one output connected to signal processor means for receiving and processing first and second electronic signals from said recording devices via said first and second speech encoder paths for transmission to a transmitter/receiver operatively connected to said signal processor means, wherein said apparatus is adpated to receive said first and second electronic signals simultaneously even if the signals are different, and said apparatus comprises a summator adapted to sum said first and second electronic signals into a sum signal for transmission to said transmitter/receiver.

23 Claims, 2 Drawing Sheets

PORTABLE COMMUNICATION DEVICE

This application claims the benefit of Provisional Application No. 60/254,293, filed Dec. 8, 2000.

FIELD OF THE INVENTION

The present invention relates to a portable communication device and a method for conference calls, and more particularly to a portable communication device with conference call capability, wherein at least two parties can use the same portable communication device for communicating with at least a third party in a conference call.

BACKGROUND OF THE INVENTION

A conventional mobile phone is used for a single user and, consequently, the mobile phone has a single microphone for receiving sound waves of human voice of the user of the phone and a single loudspeaker for reproducing sound for the user.

However, in some situations it is desirable to set up a call with more than two participants. Some prior art mobile phones, like the Ericsson mobile phone T28 and others, solve this problem by providing a conference call service that enables calls involving more than two participants. To create a conference call with three participants A, B, and C, A has a conventional prior art mobile phone with conference call capability and B and C may have either conventional prior art mobile phones or just conventional telephone sets. A makes a call to B. When B answers the call, A puts B on hold and makes a second call, this time to C. Then, A joins the calls through a particular function provided in the network. Now, all participants can hear each other at the same time.

A conference call can be created in other ways than the example described above, but this is well known and therefore not described herein in detail.

When for example A and B are at the same place and want to set up a conference call with C who is remote, it is inconvenient to create a conference call involving three phones as described above. Further, it seems to be unnecessarily expensive to have two ongoing calls at the same time. A more common and less expensive way of setting up a conference call in this case is to use a system phone provided with an additional fixed loudspeaker and fixed microphone. Then, A can make a call to C and instead of using the regular handset both A and B speak with C through the additional microphone and listen to C via the additional loudspeaker. Thus, only one call is charged at the same time.

However, it is not always possible to find a system phone in the vicinity. For example in an airport transit hall or another public place you are reduced to the case with two mobile phones, one for A and one for B for creating a conference call with the third participant C.

SUMMARY OF THE INVENTION

The object of the present invention is to provide a portable communication device such as a mobile phone with an improved conference call capability, wherein at least two parties can use the same portable communication device for communicating with at least a third party in a conference call.

This is accomplished by a portable communication device according to the present invention, comprising at least first and second speech encoder paths with first and second inputs for connection to first and second microphones, respectively, and at least one output connected to a signal processor which receives and processes first and second electronic signals from the microphones via the first and second speech encoder paths for transmission to a radio frequency transmitter/receiver operatively connected to the signal processor, wherein the apparatus is adapted to receive the first and second electronic signals simultaneously even if the signals are different, and the apparatus comprises a summator for summing the first and second electronic signals into a sum signal before transmission to the radio frequency transmitter/receiver for further transmission.

A more specific object of the invention is to provide an improved CODEC block for use in a portable communication device for conference calls.

This object is achieved by a CODEC block, comprising first and second speech encoder paths, with first and second inputs for connection to first and second microphones, respectively, wherein the block is adapted to receive first and second electronic signals simultaneously from the microphones even if the signals are different, and the block comprises a summator for summing the first and second electronic signals into a sum signal before transmission to a radio frequency transmitter/receiver of the phone.

An advantage of the present invention is that a conference call can be created between three participants with only one ongoing call, wherein two of the participants use a common portable communication device.

It should be emphasised that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

An illustrative embodiment of the invention will now be described in conjunction with the accompanying drawings, in which.

DETAILED DESCRIPTION OF THE INVENTION

Figure 1:
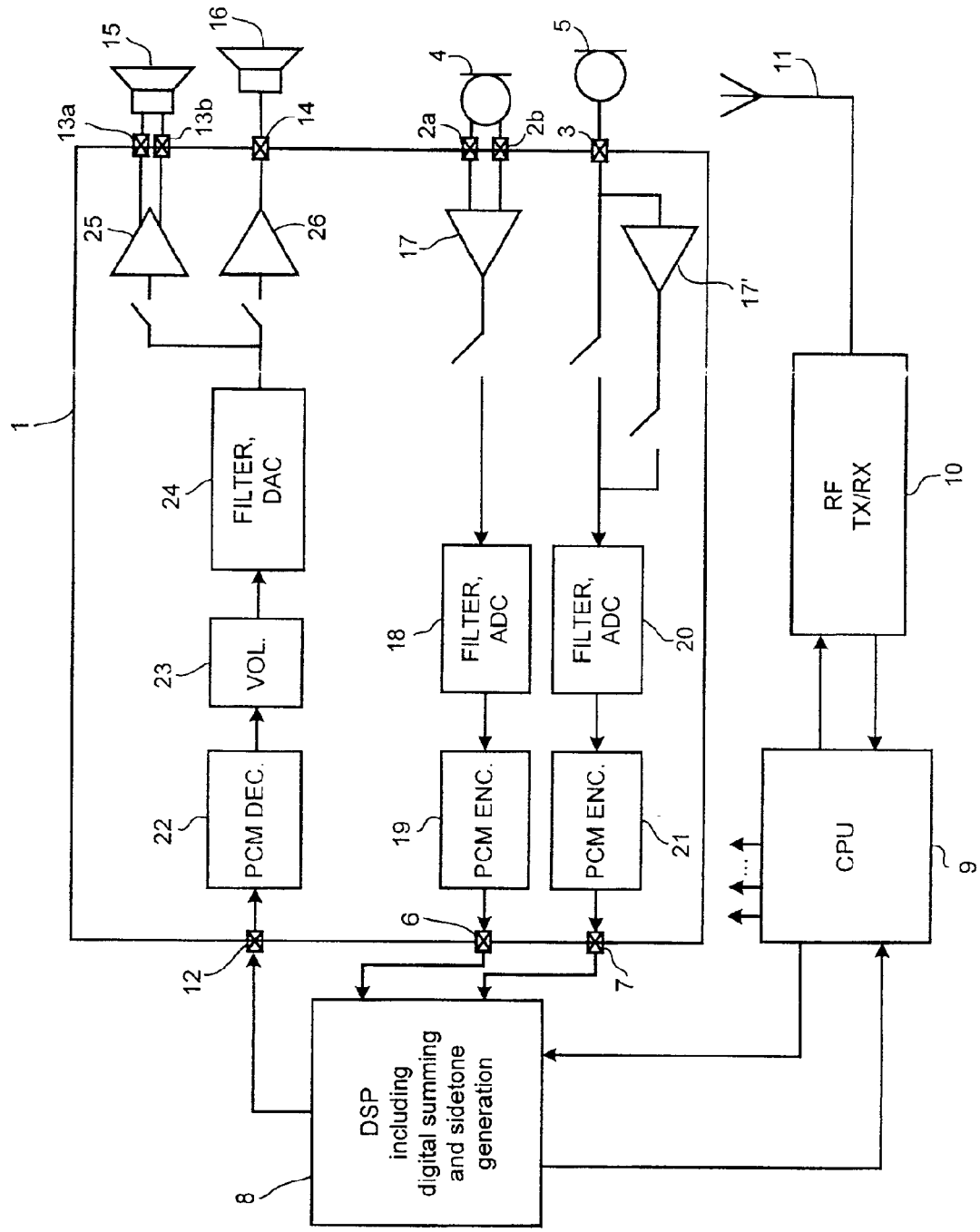
FIG. 1 is a block diagram of a portable communication device with conference call capability according to a first embodiment of the invention.

FIG. 1 of the drawings shows a block diagram of a first embodiment of a portable communication device with conference call capability according to a first embodiment of the invention.

The term portable communication device, which herein after is referred to as a mobile telephone apparatus, includes all equipment such as mobile telephones, pagers, communicators, i.e. electronic organizers, smartphones, cordless phones, satellite phones or the like.

The mobile telephone apparatus comprises a CODEC (coder and decoder) block 1 provided with first microphone/line inputs 2a,2b adapted for a conventional fixed microphone 4 and a second microphone/line input 3 adapted for example a handsfree microphone 5 in a portable handsfree device. The line inputs 2a,2b and/or 3 can be adapted for another kind of recording device such as a tape recorder or play back device for music etc.

In a conventional mobile phone with a single speech encoder path a user can speak either in the fixed microphone 4 or, when the handsfree unit is connected to the phone, in the handsfree microphone 5. According to the invention the CODEC block 1 has two speech encoder paths, which accept analogue speech from either the fixed microphone 4 or the handsfree microphone 5, separately or simultaneously. A first party A can speak in the fixed microphone 4 and a second party B in the handsfree microphone 5 at the same time, using the same mobile-phone for communicating with at least a third party C in a conference call, which is described in further detail below. The term conference call includes communication between users as well as apparatuses, such as voice mail etc, or a combination thereof.

In the case when the two speech encoder paths operate simultaneously, they generate two different PCM output bit streams via first and second PCM outputs 6 and 7 for connection to a DSP (digital signal processor) 8. However, the PCM signals could be multiplexed on the same physical output in an alternative embodiment of the invention.

The DSP 8 processes the PCM output bit streams or digital signals from the speech encoder paths, wherein the DSP generates a sum signal of the two bit streams. A central processing unit (CPU) 9 is provided in the phone for interpretation and execution of program instructions for communication with the DSP 8 and for controlling the operations of other components and blocks in the phone. The CPU 9 receives a digital sum signal processed by the DSP based on the PCM output bit streams for transmission to a radio frequency transmitter/receiver 10. The radio frequency transmitter 10 generates an RF signal for transmission through an antenna 11 to a remote mobile phone, or to a conventional telephone, not shown in the drawings, via for example a base station in a conventional cellular network.

Further, the CODEC block 1 has a speech decoder path, which operates simultaneously and independently from the speech encoder paths for duplex operation. The decoder path accepts a PCM signal on its PCM input 12 from the DSP 8 and generates analogue signals for output on first earphone/line outputs 13a,13b or a second earphone/line output 14. The first earphone/line outputs 13a,13b are adapted for a conventional fixed earphone 15 and the second earphone/line output 14 is adapted for a handsfree earphone 16 of the portable handsfree device. Additionally, the line outputs 13a,13b and/or 14 can be adapted for another kind of output device such as a recording device.

In a conventional mobile phone a user listens either in the fixed earphone 15 or, when the handsfree unit is connected to the phone, in the handsfree earphone 16.

However, in the case described above, when the handsfree device is connected and the two speech encoder paths operate simultaneously according to the invention, the fixed earphone 15 and the handsfree earphone 16 also operate simultaneously.

The user has to be provided with a sidetone from its microphone to feel comfortable in the meaning of perceiving its own voice during a telephone conversation. Thus, the user of the fixed microphone 4 and earphone 15 receives a sidetone from the fixed microphone 4 and the user of the handsfree device receives a sidetone from the handsfree microphone 5. The sidetones are generated by the DSP 8 based on the two different bit streams from the two speech encoder paths and are provided to the earphones 15 and 16 through the speech decoder path, under supervision of the CPU 9. This means that each user (party A or B) receives also the other user's (party B or A) voice signals. Hence, a true conference call capability with at least three participants is provided by the mobile phone according to the invention.

Again referring to FIG. 1 and the CODEC block 1, there are two almost identical speech encoder paths. The first path comprises microphone/line inputs 2a,2b adapted for the fixed microphone 4 connected to a microphone amplifier 17, the output of which is connected to a filter block 18. The filter block 18 comprises a transmit programmable gain stage (TX PGA) for adjustment of the total gain in the product for different sensitivities of the microphones, an analogue-to-digital converter (ADC) and a transmit band pass filter, which converts the analogue signal from the microphone to a digital signal and filters the resulting signal before input to a PCM (Pulse Code Modulation) encoder 19. The resulting PCM signal is transmitted to the DSP 8 for signal processing including summing as described above. The second path differs from the first path in that its microphone/line input 3 is adapted for the handsfree microphone 5. The microphone signal is further supplied to a filter block 20, directly or via a preamplifier 17' if necessary. The filter block 20 comprises a transmit programmable gain stage (TX PGA), an analogue-to-digital converter (ADC), and a transmit band pass filter, which converts the analogue signal from the handsfree microphone to a digital signal and filters the resulting signal before input to a PCM (Pulse Code Modulation) encoder 21. The resulting PCM signal is transmitted to the DSP 8 for signal processing and summing with the PCM signal from the first speech encoder path.

As described above the CODEC block 1 has a speech decoder path, which operates simultaneously and independently from the speech encoder paths for duplex operation. The PCM signal accepted by the PCM input 12 from the DSP 8 is transmitted to a PCM voice decoder 22. The output signal from the decoder 22 is fed through a programmable volume control 23. Further, the volume-controlled signal is fed through a filter block 24, comprising a receiver low-pass filter, a digital-to-analogue converter for converting the PCM decoded signal into an analogue signal. Before input to a first earphone amplifier 25 for the fixed earphone 15 and/or to a second earphone amplifier 26 for the handsfree earphone 16, the signal passes a receive programmable gain stage (PGA) in the filter block 24, enabling adjustment of the circuit for different sensitivity of the earphone(s) and is spread in the path.

Generally, when the handsfree device 5,16 is connected to the mobile phone, the profile or mode of the phone is set automatically to a portable handsfree profile. This profile implies at least that the fixed earphone and fixed microphone are disconnected. The conference call capability according to the invention is, however, activated by changing to a particular pre-programmed profile in the phone or by changing a corresponding setting in the phone.

Figure 2:
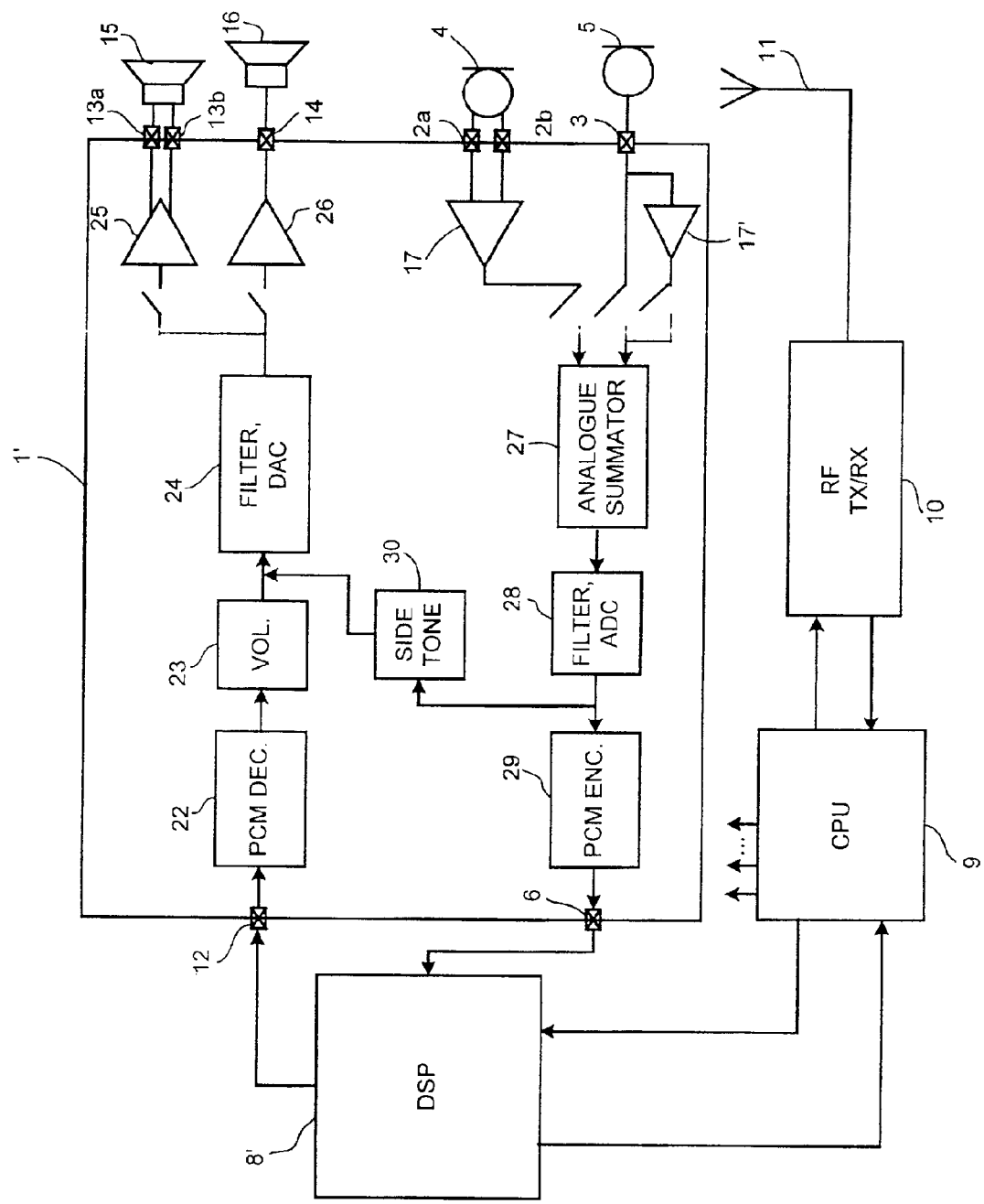
FIG. 2 is a block diagram of a portable communication device with conference call capability according to a second embodiment of the invention.

A second embodiment of a block diagram of a mobile telephone apparatus with conference call capability according to the invention is shown in FIG. 2.

The difference between the first and second embodiment is that the summing is performed on the digital PCM signals in the first embodiment and on the analogue signals in the second embodiment.

The first speech encoder path according to the second embodiment of the CODEC block 1' comprises the microphone/line inputs 2a,2b adapted for the fixed microphone 4 connected to a microphone amplifier 17 in a similar way as for the first embodiment. However, the output of the amplifier 17 is connected to an analogue summator 27. The second path also has a microphone/line input 3, which is adapted for the handsfree microphone 5. The microphone signal is further supplied to the summator 27, directly or via a preamplifier 17' if necessary.

The output of the amplifier comprises the analogue sum signal. The signal is filtered through a filter block 28, which comprises a transmit programmable gain stage (TX PGA), an analogue-to-digital converter (ADC), and a transmit band pass filter, which converts the analogue signal from the microphone to a digital signal and filters the resulting signal before input to a PCM (Pulse Code Modulation) encoder 29. The resulting PCM sum signal is transmitted to the DSP 8' for signal processing before transmission through a remote party through the RF transmitter 10.

As described above, each user has to be provided with a sidetone from its respective microphone to feel comfortable in the meaning of perceiving its own voice during a telephone conversation. Thus, the user of the fixed microphone 4 and earphone 15 receives a sidetone from the fixed microphone 4 and the user of the handsfree device receives a sidetone from the handsfree microphone 5, respectively. In the second embodiment the sidetones are generated by a sidetone block connected between the output of the filter block 28 in the speech encoder path and the input of the filter block 24 in the speech decoder path, which is controlled by the CPU 9. Thus, the sidetones are based on the two different analogue signals from the microphone 4 and the handsfree microphone 5 and are provided to both earphone 15 and the handsfree earphone 16, respectively. This means that each user (party A or B) receives even the other user's (party B or C) voice signals. Hence, a true conference call capability with at least three parties is provided by the mobile phone according to the second embodiment of the invention.

Although the invention has been described by way of a specific embodiment thereof, it should be apparent that the present invention provides a mobile phone with an improved conference call capability that fully satisfy the aims and advantages set forth above, and alternatives and modifications are possible within the scope of the invention.

For example, in an alternative embodiment the fixed microphone and the fixed earphone are replaced by another handsfree device.

In still another embodiment of the invention, the recording device/devices is/are connected to the phone by a short-range radio communication link such as Bluetooth®.

What is claimed is:

1. A portable communication device for conference calls, comprising:
   at least first and second speech encoder paths with first and second inputs for connection to first and second recording devices, respectively; and
   at least one output connected to signal processor means for receiving and processing first and second electronic signals from said recording devices via said first and second speech encoder paths for transmission to a transmitter/receiver operatively connected to said signal processor means;
   wherein said at least first and second speech encoder paths are integrated in said portable communication device and said portable communication device is adapted to receive said first and second electronic signals simultaneously even if the signals are different; and
   wherein said portable communication device comprises a summator integrated in said portable communication device adapted to sum said first and second electronic signals into a sum signal for transmission to said transmitter/receiver.

2. The portable communication device according to claim 1, wherein said summator is adapted to sum said first and second electronic signals into a sum signal for transmission to at least two outputs, and operatively connected to said signal processor means, for connection to a plurality of devices.

3. The portable communication device according to claim 1 or 2, wherein said signal processor means is a digital signal processor.

4. The portable communication device according to claim 3, further comprising at least an analogue-to-digital converter for converting said first and second electronic signals into digital signals before input to said digital signal processor.

5. The portable communication device according to claim 4, wherein said summator is a part of said digital signal processor.

6. The portable communication device according to claim 4, wherein said summator is an analogue summator, which is a part of said first and second speech encoder paths for summing said first and second electronic signal into an analogue sum signal before A/D conversion into a digital sum signal.

7. The portable communication device according to claim 2, further comprising:
   a sidetone generator for generating a first sidetone of said first electronic signal for transmission to said plurality of output devices, and a second sidetone of the second electronic signal for transmission to said plurality of devices simultaneously via a speech decoder path of said portable communication device.

8. The portable communication device according to claim 7, wherein said sidetone generator is a part of said digital signal processor.

9. The portable communication device according to claim 7, wherein said sidetone generator is an analogue sidetone generator connected between said first and second speech encoder paths and said speech decoder path of said portable communication device for transmission of said first and second electronic signals to first and second earphone outputs of said speech decoder path.

10. The portable communication device according to claim 2, wherein said first recording device is a conventional fixed microphone or a microphone in a first portable handsfree device, and said second recording device is a microphone in a second portable handsfree device, and a first output device of said plurality of devices is an earphone in said first portable handsfree device, and a second output device of said plurality of devices is an earphone in said second portable handsfree device.

11. The portable communication device according to claim 1, wherein at least one of said first and second inputs are adapted for wireless connections to said first and second recording devices.

12. The portable communication device according to claim 2, wherein at least one of said at least two outputs is adapted for wireless connections to at least two recording devices.

13. The portable communication device according to claim 12, wherein said wireless connections are short-range radio communication links.

14. The portable communication device according to claim 1, wherein the portable communication device is a mobile telephone apparatus.

15. A CODEC block for use as an integrated part of a portable communication device for conference calls, comprising:
   first and second speech encoder paths, with first and second inputs for connection to first and second recording devices, respectively; and a common output for connection to signal processor means of said portable communication device;

wherein said CODEC block is adapted to receive first and second electronic signals simultaneously from said first and second recording devices even if the signals are different; and wherein said CODEC block comprises a summator for summing said first and second electronic signals into a sum signal for transmission to a transmitter/receiver of said portable communication device.

16. The CODEC block according to claim 15, wherein said summator is adapted to sum said first and second electronic signals into a sum signal for transmission to at least two outputs, and operatively connected to said signal processor means for connection to a plurality of devices.

17. The CODEC block according to claim 15, further comprising at least an analogue-to-digital converter for converting said first and second electronic signals into digital signals before input to said digital signal processor.

18. The CODEC block according to claim 17, wherein said summator is an analogue summator, which is a part of said first and second speech encoder paths for summing said first and second electronic signal into an analogue sum signal before A/D conversion into a digital sum signal.

19. The CODEC block according to claim 15, further comprising a sidetone generator connected between said first and second speech encoder paths and a speech decoder path for transmission of said first and second electronic signals to first and second earphone outputs of said speech decoder path.

20. The CODEC block according to claim 19, wherein said sidetone generator is an analogue sidetone generator.

21. A method of conference calls in a portable communication device having separate inputs to at least first and second speech encoder paths integrated in said portable communication device and operatively connected to a summator integrated in said portable communication device, wherein first and second electronic signals are received from recording devices operatively connected to said separate inputs of said portable communication device comprising the steps of:

receiving in said portable communication device via said inputs said first and second electronic signals simultaneously even if the signals are different; and generating by said summator a sum signal of said first and second electronic signals for transmission to a transmitter/receiver of said portable communication device.

22. The method according to claim 21, further comprising the step of generating a sum signal of said first and second electronic signals for transmission to at least two outputs of said portable communication device for connection to a plurality of devices.

23. The method according to claim 22, further comprising the step of generating a first sidetone of said first electronic signal for transmission to said at least two outputs, and a second sidetone of the second electronic signal for transmission to said at least two outputs, wherein said at least two outputs comprise earphone outputs.

* * * * *